United States Patent Office 3,438,962
Patented Apr. 15, 1969

3,438,962
MONOAZO-TRIAZINE CONTAINING
DYESTUFFS
Henri Riat, Arlesheim, and Gert Hegar, Basel, Switzerland, assignors to Ciba Limited, Basel, Switzerland, a company of Switzerland
No Drawing. Continuation-in-part of application Ser. No. 266,525, Mar. 20, 1963. This application Aug. 27, 1965, Ser. No. 483,298
Claims priority, application Switzerland, Mar. 26, 1962, 3,598/62
Int. Cl. C09b 62/08, 62/82, 62/50
U.S. Cl. 260—153                     11 Claims

ABSTRACT OF THE DISCLOSURE

Monoazo dyestuffs of the formula (1) 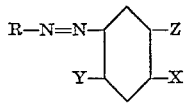

in which R represents a radical of a naphthalene trisulfonic acid, Y and Z each represent a hydrogen atom or an alkyl group of low molecular weight (for example, a methyl or ethyl group) or an alkoxy group of low molecular weight (for example, a methoxy or ethoxy group), and X represents the radical of a mono-halogenated 1:3:5-triazine bound through an amino bridge, especially through an —NH-bridge.

---

This is a continuation-in-part of our application Ser. No. 266,525, filed Mar. 20, 1963 now abandoned.

The present invention concerns reactive monoazo dyestuffs, i.e. monoazo dyestuffs which can be bound to the hydroxyl groups of the cellulose.

It is an object of the present invention to provide reactive monoazo dyestuffs which yield on cellulosic fibers strong dyeings which are fast to chlorine and from which the unfixed dyestuff is easily removed.

Other objects will become evident from the following:
The present invention provides new, valuable monoazo dyestuffs of the formula (1) 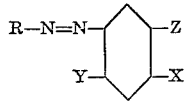

in which R represents a radical of a naphthalene trisulfonic acid, Y and Z each represent a hydrogen atom or an alkyl group of low molecular weight (for example, a methyl or ethyl group) or an alkoxy group of low molecular weight (for example, a methoxy or ethoxy group), and X represents the radical of a mono-halogenated 1:3:5-triazine bound through an amino bridge, especially through an —NH-bridge. The present invention provides more especially monoazo dyestuffs of the kind defined that contain a 2-chloro-4-amino-1:3:5-triazine radical, the amino group of which may contain a radical not of dyestuff character.

The dyestuffs of the invention are obtained by condensing trihalogen-1:3:5-triazines, especially 2:4:6-trichloro-1:3:5-triazine, on the one hand with an aminomonoazo dyestuff of the formula (2) 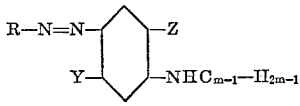

in which R, Y and Z have the meanings ascribed to them in Formula 1 and $m$ represents a positive integer not greater than 3, and on the other hand with an amine, preferably one without dyestuff character, or with a phenol or with a mercaptan in such a manner that monohalogen triazine condensation products are formed. Instead of using trihalogen-triazines as starting materials, it is also possible to condense a dyestuff of the Formula 2 with a dihalogen-1:3:5-triazine, for example, 2-methyl-, 2-phenyl-, 2-methoxy-, 2-phenoxy-, 2-phenylthio- or a 2-amino-4:6-dichloro- or dibromo-1:3:5-triazine in a molar ratio of 1:1.

In order to prepare the dyestuffs of the Formula 2, used as starting materials, diazotized 1- or 2-aminonaphthalene-trisulfonic acids, such as 1-naphthyl-amine-2:4:7-, -2:4:8-, -2:5:7-, -3:6:8- or -4:6:8-trisulfonic acid and 2-naphthylamine-1:3:7-, -1:5:7-, -3:5:7-, -4:6:8- or -3:6:8-trisulfonic acid can be coupled in a slightly acid medium with ortho- or meta-toluidine, cresidine, aminohydroquinone dimethyl ether, ortho- or meta-anisidine, aniline, N-methylaniline or with xylidine.

The diazotization of the aminonaphthalene trisulfonic acid used in the preparation of the dyestuffs of the Formula 2 can be carried out by known methods, for example, with the aid of a mineral acid, especially hydrochloric acid, and sodium nitrite. The coupling of the diazo compounds so obtained with said aniline derivatives that couple in 4-position can likewise be carried out by known methods.

The condensation of the aminomonoazo dyestuffs so obtained with cyanuric chloride is carried out in such a manner that two replaceable halogen atoms remain in the resulting condensation product, one of which, in the process of the invention, is exchanged for the radical of a hydroxyl, mercapto or an amino compound, advantageously one without dyestuff character. As such compounds, which may be used, in addition to ammonia, are amines such as methyl-, dimethyl-, ethyl-, diethyl-, propyl-, isopropyl-, butyl-, isobutyl-, hexyl- or cyclohexylamine, β - chlorethylamine, piperidine, morpholine, γ - methoxypropylamine, methoxyethylamine, ethanolamines, propanolamines, hydrazine, thio-semicarbazide, glycocoll, aminocarbonic acid esters, such as the methyl or ethyl ester, amino acetic acid ethyl ester, aminoacetamide and, more especially, amines that contain sulfonic acid groups and/or carboxyl groups such as 1-aminobenzene-2:5-disulfonic acid, 1-aminobenzene-2-, -3- or -4-sulfonic acid, 1-aminobenzene-2-, -3- or -4-carboxylic acid, sulfoanthranilic acid, aminonaphthalene-mono- and -disulfonic acid, 1-aminodiphenyl-4'-sulfonic acid, β-aminoethane sulfonic acid and N-methylaminoethane sulfonic acid.

In the process of the invention the condensation of said amino compounds with the dihalogen-triazine dyestuffs is advantageously carried out in the presence of an agent capable of binding acid such as sodium carbonate or sodium hydroxide under conditions that ensure that a replaceable halogen atom still remains in the finished product, that is to say, for example, in an organic solvent or at a relatively low temperature in an aqueous medium.

The azo dyestuffs of the invention can also be made by a modification of the process described above. This modification of the process consists in condensing aminomonoazo dyestuffs of the Formula 2 with 2:4-dichloro or 2:4-dibromo-1:3:5-triazines such as 6-methyl-, 6-phenyl-, 6-phenylthio-, 6-phenoxy-, 6-methoxy-, 6-sulfophenylamino-2:4-dichloro-1:3:5-triazine in such a manner that a replaceable halogen atom is still present in the resulting condensation product.

Suitable 2:4-dihalogen-1:3:5-triazines can be made by known methods from cyanuric halides such as cyanuric bromide or cyanuric chloride by reacting, for example, 1 mol of cyanuric chloride with 1 mol of a phenol or a mercaptan or with 1 mol of an amine. The dihalogen-triazine compounds so obtained can be condensed with said aminoazo dyestuffs that contain an acylatable amino group to form the azo dyestuffs of the invention.

Thus in the preparation of the monohalogen-triazine dyestuffs of the invention by the condensation of the aforesaid aminoazo dyestuffs with cyanuric chloride and one of the aforesaid amines the condensations can be carried out in any desired sequence, whereas when phenols, alcohols or mercaptans are used, these products are advantageously first condensed with the trihalogen-triazine to form dihalogen-triazines.

The dyestuffs of the invention can be isolated and processed into useful, dry dyestuff preparations.

The isolation of the products obtained in the process of the invention is advantageously carried out at as low a temperature as possible by salting out and filtration. If desired, the filtered dyestuffs can be dried after the addition of diluents and buffers such as mixtures of equal parts of mono-sodium phosphate and di-sodium phosphate; the drying process is advantageously carried out at not too high a temperature and under reduced pressure. In some cases the dry preparations of the invention can be prepared directly, i.e. without intermediate isolation of the dyestuffs, by spray-drying the dyestuff products as obtained from the reaction mixtures.

The new dyestuffs of the invention are suitable for dyeing or printing a very wide variety of materials, for example, wool, silk, leather and polyamides but more especially fibrous materials that contain cellulose such as linen, regenerated cellulose and more especially cotton. They are particularly suitable for dyeing by the so-called pad-dyeing process in which the fabric is impregnated with an aqueous dyestuff solution that may contain salt, and the dyestuff is fixed, advantageously with the application of heat, after treatment with an alkali. This process and the direct dyeing process, by which many of the dyestuffs of the invention can be applied, yield valuable dyeings fast to washing, and fast prints are obtained in the printing process.

The dyeings and prints produced with the new dyestuffs on fibers that contain cellulose are generally distinguished by a good fastness to light and more especially by a very good fastness to washing and by the ease with which any unfixed dyestuff can be washed off.

The dyeings and prints are also fast to chlorine especially to the treatments with hypochlorite. The unfixed dyestuffs are easily removed from the prints obtained with the new dyestuffs and they do not stain the unprinted white ground.

Unless otherwise stated, the parts and percentages in the following Examples are by weight, and the relationship of parts by weight to parts by volume is the same as that between the gram and the cubic centimeter.

EXAMPLE 1

56.7 parts of the sodium salt of 2-(4'-amino-2'-methyl-phenylazo)-naphthalene-4:6:8-trisulfonic acid (obtained by coupling diazotized 2-naphthylamino-4:6:8-trisulfonic acid with 3-methyl-1-aminobenzene) were dissolved in 800 parts of water, cooled to 0 to 5° C. and a solution of 18.5 parts of cyanuric chloride in 50 parts of acetone added. The mixture was stirred for 1 hour and the pH value maintained at about 6 by the gradual dropwise addition of a dilute sodium hydroxide solution. As soon as a free amino group could no longer be detected, 50 parts of a 10% ammonia solution were added and the whole stirred for 2 hours at 40° C. The dyestuff was precipitated from the solution so obtained by the addition of sodium chloride, filtered off and dried. The dyestuff was obtained in the form of a yellow powder that dyed cotton very fast yellow tints.

EXAMPLE 2

55.3 parts of the trisodium salt of 2-(4'-aminophenyl-azo)-naphthalene-4:6:8-trisulfonic acid (obtained by coupling diazotized 2-naphthylamine-4:6:8-trisulfonic acid with aniline-ω-methane sulfonic acid and subsequent hydrolysis of the ω-methane sulfonic acid by heating with a dilute sodium hydroxide solution) were dissolved in 750 parts of water, and an aqueous solution of the sodium salt prepared from 34.3 parts of 2:4-chloro-6-phenyl-amino-1:3:5-triazine-3'-sulfonic acid was added. The mixture was stirred for 3 hours at 40° C., the pH value being maintained between 6 and 7 by the addition of dilute sodium hydroxide solution. After the condensation, the resulting monochlorotriazine dyestuff was salted out, filtered off and dried. It dyed cotton pure yellow tints.

In the following table further examples of starting materials are listed in Columns I, II and III, from which dyestuffs and dry preparations containing them can be obtained as described above, the tints obtained on cotton being given in Column IV.

| I | II | III | IV |
|---|---|---|---|
| 2-naphthylamine-4:6:8-trisulfonic acid. | Aniline | Ammonia | Yellow. |
| Do | do | Morpholine | Do. |
| Do | do | 2-amino-5-sulfo-benzoic acid. | Do. |
| Do | do | 2-aminoethanol | Do. |
| Do | do | Diethanolamine | Do. |
| Do | do | N-methylaniline | Do. |
| 2-naphthylamine-3:6:8-trisulfonic acid. | 2-methoxy-5-methylaniline. | 1-aminobenzene-4-sulfonic acid. | Do. |
| Do | do | 1-aminobenzene-2:5-disulfonic acid. | Do. |
| 2-naphthylamine-4:6:8-trisulfonic acid. | 2:5-dimethoxy-aniline. | do | Yellow-orange. |
| Do | do | 1-aminobenzene-3-sulfonic acid. | Do. |
| 2-naphthylamine-4:6:8-trisulfonic acid. | 2:5-dimethyl-aniline. | Ammonia | Yellow. |
| Do | 2-methoxyaniline | do | Do. |
| 2-naphthylamine-4:6:8-trisulfonic acid. | Aniline | 1-aminonaphthalene-6-sulfonic acid. | Yellow. |
| Do | do | Aniline | Do. |
| Do | do | Phenol | Do. |
| 2-naphthylamine-3:6:8-trisulfonic acid. | do | Ammonia | Do. |
| 2-naphthylamine-4:6:8-trisulfonic acid. | do | Thiophenol | Do. |
| 2-naphthylamine-4:6:8-trisulfonic acid. | N-methylaniline | Ammonia | Do. |
| 2-naphthylamine-3:6:8-trisulfonic acid. | do | do | Do. |

EXAMPLE 3

A solution of 18 parts of 2:4-dichloro-6-methoxy-1:3:5-triazine in 50 parts of acetone was added to an aqueous solution of 55.3 parts of the trisodium salt of 2-(4'-aminophenylazo)-naphthalene-4:6:8-trisulfonic acid and the mixture stirred for 3 hours at 40° C. at a pH value between 6 and 7. The dyestuff so obtained dyed cotton yellow tints.

By using the corresponding proportion of 2:4-dichloro-6-methylthio-1:3:5-triazine instead of 2:4-dichloro-6-methoxy-1:3:5-triazine, a dyestuff having similar properties was obtained.

Dyeing prescription 2 parts of dyestuff were dissolved in 100 parts of water. A cotton fabric was padded with this solution and the excess liquor squeezed off in such a manner that the fabric retained 75% of dyestuff solution, calculated on the weight of the fabric.

The fabric so impregnated was dried and impregnated at room temperature with a solution that contained 10 parts of sodium hydroxide and 300 parts of sodium chloride per liter; it was then squeezed to retain 75% of its weight of liquor and steamed for 60 seconds at 100 to 101° C. The fabric was rinsed, treated in a 0.5% sodium bicarbonate solution, rinsed, soaped at the boil for 15 minutes in a 0.3% solution of a non-ionic detergent, and then rinsed and dried.

What is claimed is:

1. Monoazo dyestuffs of the formula

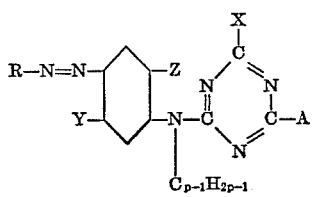

in which R represents the radical of a naphthalene-trisulfonic acid, Y and Z each represent a member selected from the group consisting of a hydrogen atom, a lower alkyl and lower alkoxy group, X represents a member selected from the group consisting of the bromine and the chlorine atoms, A is a member selected from the group consisting of the amino, phenoxy, lower alkoxy and lower alkyl thio groups and $p$ is a whole positive number up to and including 2.

2. Monoazo dyestuffs of the formula

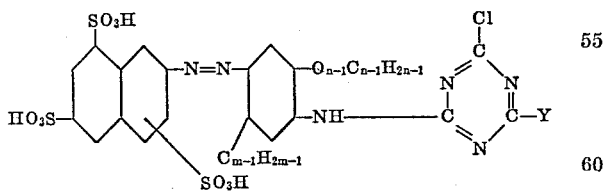

in which Y represents an amino group, $n$ and $m$ each represents a positive integer not greater than 2.

3. The dyestuffs of claim 2 wherein Y is an $NH_2$-group.
4. The dyestuffs of claim 2 wherein Y is sulfophenylamino.
5. The dyestuffs of claim 2 wherein Y is carboxyphenylamino.
6. The dyestuffs of claim 2 wherein Y is morpholino.

7. The dyestuffs of the formula

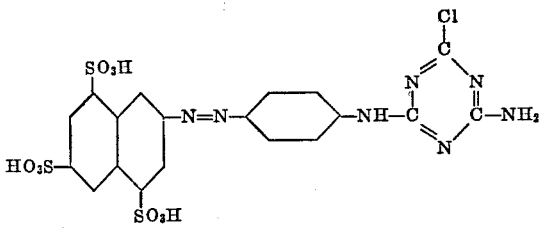

8. The dyestuff of the formula

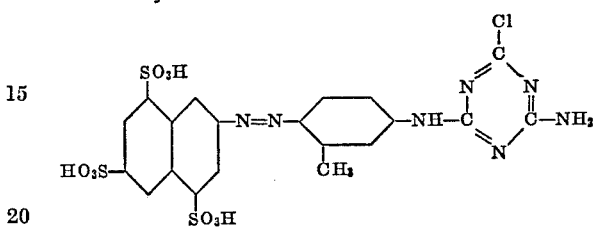

9. The dyestuff of the formula

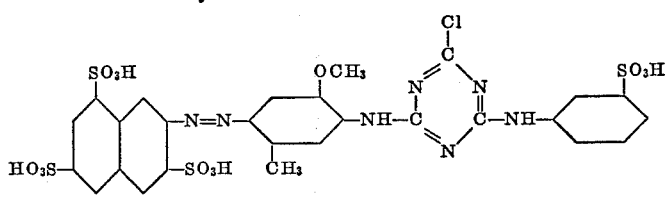

10. The dyestuff of the formula

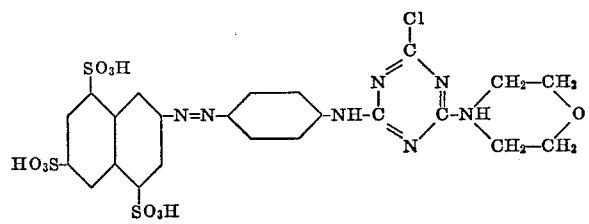

11. The dyestuff of the formula

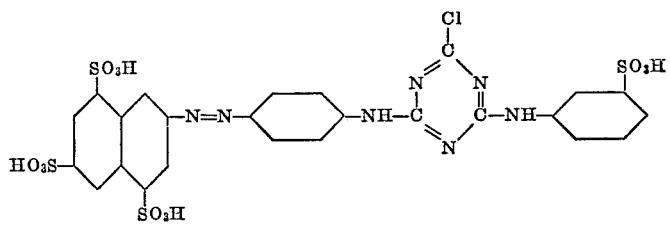

References Cited

UNITED STATES PATENTS 2,945,022  7/1960  Fasciati et al. _____ 260—153
2,951,837  9/1960  Andrew et al. _____ 260—153

CHARLES B. PARKER, *Primary Examiner.*

D. M. PAPUGA, *Assistant Examiner.*

U.S. Cl. X.R.

8—13, 41, 51, 55, 54.2; 260—37, 196, 249.5, 249.8